United States Patent [19]

Slicker et al.

[11] Patent Number: 4,777,422

[45] Date of Patent: Oct. 11, 1988

[54] INDUCTION MOTOR FLUX ESTIMATOR/CONTROLLER

[75] Inventors: James M. Slicker, Union Lake; Susan R. Cikanek, Northville, both of Mich.

[73] Assignee: Eaton Corporation, Cleveland, Ohio

[21] Appl. No.: 928,317

[22] Filed: Nov. 7, 1986

[51] Int. Cl.$^4$ .............................................. H02P 5/40
[52] U.S. Cl. ................................ 318/800; 318/808
[58] Field of Search ................................ 318/800–803, 318/807–811

[56] References Cited

U.S. PATENT DOCUMENTS

| | | | |
|---|---|---|---|
| 4,418,308 | 11/1983 | Bose | 318/811 |
| 4,437,051 | 3/1984 | Muto et al. | 318/811 |
| 4,503,375 | 3/1985 | Okuyama | 318/802 |
| 4,516,065 | 5/1985 | Ninomiya et al. | 318/811 |

Primary Examiner—David Smith, Jr.
Attorney, Agent, or Firm—Krass and Young

[57] ABSTRACT

A reduced-order, discrete-time rotor flux estimator for use in a field-oriented induction motor control system utilizing rotor speed as an input.

9 Claims, 4 Drawing Sheets

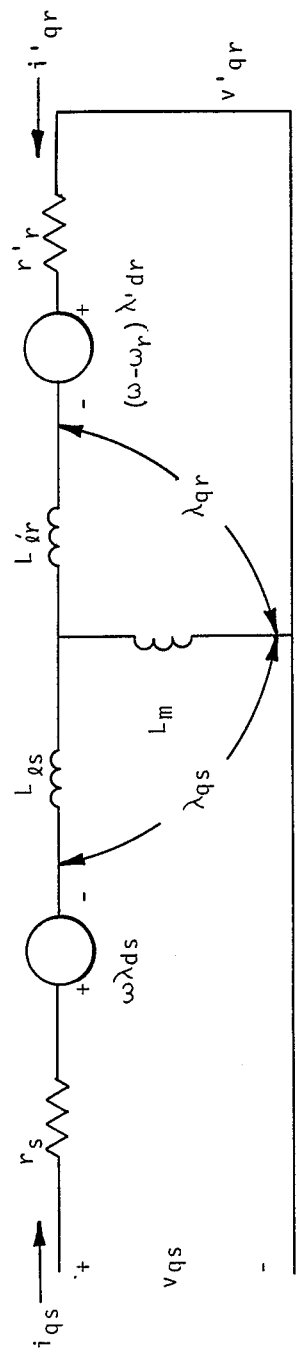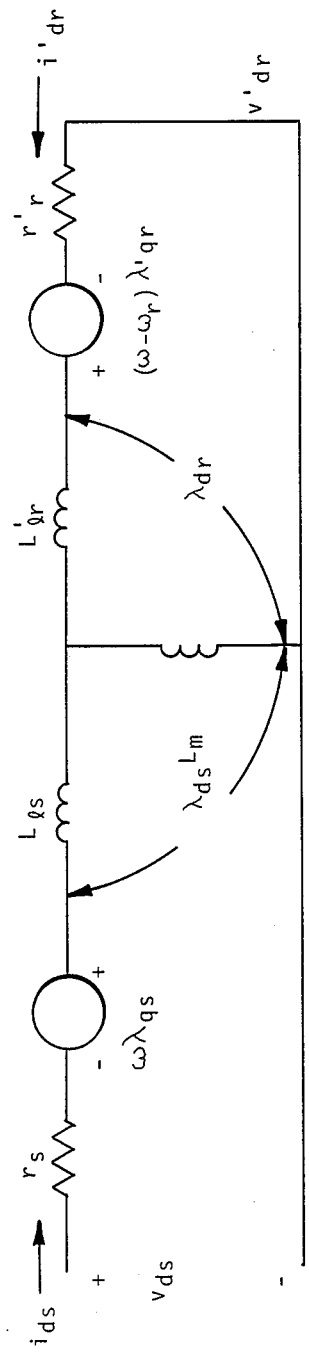

INDUCTION MOTOR FLUX ESTIMATOR/CONTROLLER

FIELD OF THE INVENTION

This invention relates to field-oriented control of induction motors and particularly to a method and apparatus for providing precise control over induction motor operating characteristics by generating a rotor flux estimate, the error level of which rapidly converges toward zero.

BACKGROUND OF THE INVENTION

Industrial applications such as robotics, automated machine tools and precise positioning systems are generally implemented with DC-servo motors as power sources. DC motors are commonly used for applications requiring characteristics such as fast response and good low speed control because the torque developed by a DC motor is proportional to the armature current. The armature current of a DC motor is easily controlled using current feedback. Although the AC induction motor enjoys a number of advantages such as higher output per unit mass over the DC motor, the fact that rotor flux is induced rather than directly controlled has traditionally disqualified the AC induction motor from many high performance, high precision industrial applications.

The recent development of field oriented control has now made fast torque control of induction motors achievable. Analogous to the DC machine, the torque control of an AC motor will be achieved through current control, however, in the AC case this must also include the phase as well as the amplitude.

In the DC motor the commutator and the brushes fix the orientation of the field flux and the armature mmf. However, in the AC machine, the orientation of the field flux and armature mmf must be controlled externally. If this orientation is not controlled in the AC motor then the angles between the various fields vary with loads and transients making for an oscillatory dynamic response. With the orientation between the fields controlled externally in the AC motor, current feedback can be applied to allow torque control.

Various approaches have been made to qualify the induction motor for high performance applications using various concepts of field oriented control. One approach involves the measurement of rotor flux and the determination of stator terminal excitation values needed to produce desired torque or speed conditions.

As a practical matter it is impossible to accurately measure rotor flux vector position and magnitude in an induction motor. It is known to place flux detectors in induction motors and to utilize such devices in control systems. However, complex adjustable filters are required, since strong slot harmonics, the frequency of which is speed dependent, are superimposed upon the fundamental signal. Generally, the accuracy of a torque signal computer from this information is likely to be poor, since torque is an integral quantity which is difficult to measure on the basis of local field measurements.

SUMMARY OF THE INVENTION

Through the present invention, an induction motor is qualified for use in a high performance system such as a servo-positioning system. This is accomplished, according to the method aspect of the invention, by field oriented control in which rotor flux is estimated in a real-time, reduced-order mathmatical model, hereinafter called an "estimator," in which time-varying quantities are rapidly sampled and the estimator gains are updated to cause the rotor flux error to rapidly converge toward zero.

According to the apparatus aspect of the invention, a real-time, reduced-order flux estimator is implemented in a digital processor connected to receive rotor speed as an input and to produce stator terminal signals which are impressed upon the stator terminals to produce motor operating characteristics accurately responding to input commands.

BRIEF DESCRIPTION OF THE DRAWING

FIGS. 1a and 1b are drawings of the induction motor dq axis equivalent circuit;

DETAILED DESCRIPTION OF AN ILLUSTRATIVE EMBODIMENT

Figure 2:
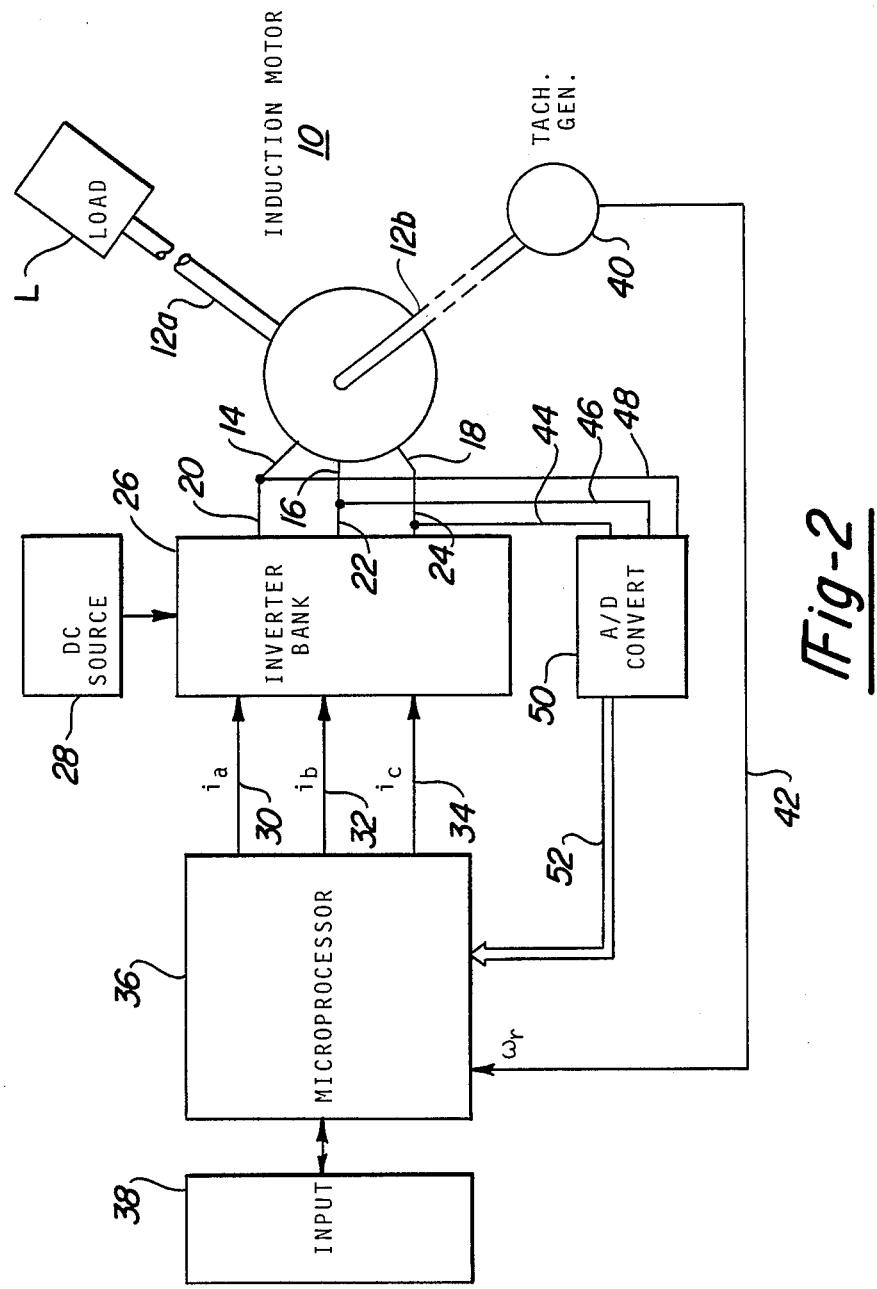
FIG. 2 is a block diagram of an induction motor control system utilizing the present invention.

The following explanation directed toward FIGS. 1, 3 and 4 of the drawing involves the use of numerous mathematic manipulations of various quantities, the symbols for which, for purposes of convenience, are introduced at this time in the following table:

TABLE 1

| | |
|---|---|
| $L_r$ | rotor inductance |
| $L_s$ | stator inductance |
| $L_m$ | mutual inductance |
| $L_s'$ | stator transient inductance $= \dfrac{L_r L_s - L_m^2}{L_r}$ |
| $i_{qs}$ | quadrature axis stator current (torque current), also Ist |
| $r_s$ | stator resistance |
| $r_r$ | rotor resistance |
| $i_{ds}$ | direct axis stator current (field current), also $Is\phi$ |
| $\omega_e$ | stator frequency |
| $\lambda_{qr}$ | quadrature axis, rotor flux |
| $\lambda_{dr}$ | direct axis, rotor flux |
| $\omega_{sl}$ | slip frequency |
| $\omega_{ref}$ | speed command |
| $V_{qs}$ | quadrature axis stator voltage |
| $V_{ds}$ | direct axis stator voltage |
| $\omega_r$ | rotor frequency |
| b | $-[r_s + L_m^2/[L_r * T_r]]$ |
| $T_r$ | rotor time constant $L_r/F$ |
| T | sample time |
| L | estimator gain matrix |
| $\underline{i_s}$ | vector representation of $i_{qs}$ and $i_{ds}$ |
| $\underline{V_s}$ | vector representation of $V_{qs}$ and $V_{ds}$ |
| $\overline{W}_b$ | motor base speed |
| $\theta_{error}$ | rotor position error |
| $\theta_s$ | uncorrected rotor flux position |
| $\theta_{rf}$ | estimated position of rotor flux |
| Te | electrical torque |

The following description refers to the two parts A and B of FIG. 1 and is background to the description of the illustrative embodiment which follows.

The stator current in the induction motor is oriented such that the stator current can be used to control motor torque. The following explains how this is accomplished.

It is well known that the voltage, flux, and current in the induction motor, being vector quantities reflecting their spatial relationships within the machine, can be completely described in a two dimensional coordinate system. For convenience, this representation is commonly used and the two axes of this coordinate system are commonly referred to as the "direct" or "d" axis and the quadrature or "q" axis. A full description of this can be found in "Simulation of Symmetrical Induction Machinery", P. C. Krause and C. H. Thomas, *Transactions on Power Apparatus and Systems*, vol. pas 5-84, No. 11, November 1965, incorporated herein by reference.

In order to express the vector quantities of the machine in terms of d.c. quantities instead of sinusoidally varying a.c. values, it is customary to let the "d-q" coordinate system rotate at the stator frequency. This is referred to as the syncronously rotating coordinate system, in contrast to a stationary coordinate system.

The resulting d-q model equivalent circuit is given in FIG. 1. Voltage loop equations for this circuit are given as equations 1 to 4 below. The motor flux relationships, given by equations 5 to 8 can also be determined from the d-q model equivalent circuit.

$$v_{qs}^e = r_s i_{qs}^e + p\lambda_{qs}^e + \omega_e \lambda_{ds}^e \quad (1)$$

$$v_{ds}^e = r_s i_{ds}^e + p\lambda_{ds}^e - \omega_e \lambda_{qs}^e \quad (2)$$

$$0 = r_r i_{qr}^e + p\lambda_{qr}^e + (\omega_e - \omega_r)\lambda_{dr}^e \quad (3)$$

$$0 = r_r i_{dr}^e + p\lambda_{dr}^e - (\omega_e - \omega_r)\lambda_{qr}^e \quad (4)$$

$$\lambda_{qs}^e = L_s i_{qs}^e + L_m i_{qr}^e \quad (5)$$

$$\lambda_{ds}^e = L_s i_{ds}^e + L_m i_{dr}^e \quad (6)$$

$$\lambda_{qr}^e = L_m i_{qs}^e + L_r i_{qr}^e \quad (7)$$

$$\lambda_{dr}^e = L_m i_{ds}^e + L_r i_{dr}^e \quad (8)$$

The torque in terms of the rotor fluxes, $\lambda qr$, $\lambda dr$, and rotor currents, $iqr$, $idr$, is:

$$Te = nP/4[\lambda qr*idr - \lambda dr*iqr]$$

Since these fluxes and currents are sufficient to form a state variable representation of the system, it is seen that the torque is a non-linear function of system state variables. The dynamic control of this fourth order non-linear system has been demonstrated to have slow response and is not suitable for applications needing fast torque response such as positioning systems.

A recent development in the control of induction motors is field oriented control. This control results if the angle of the axes of the d-q coordinate system are oriented such that all of the rotor flux lies in the d-axis. If this is done, no rotor flux will lie in the q-axis and the term $\lambda qr$ in the above torque equation will be zero. The reduced torque equation will be:

$$Te = -(nP/4)*\lambda dr * iqr$$

Now from equation [7] above, since the term $\lambda qr$ has been forced to zero, an expression can be obtained for $iqs$ as follows:

$$iqr = -(Lm/Lr)*iqs$$

From equation [4] above, under steady state conditions, the fact that $idr$ equals zero is recognized. Applying this fact to equation [8], an expression for $\lambda dr$ in terms of $ids$ is recognized as:

$$\lambda dr = Lm * ids$$

Substituting these results into the second torque equation, the usable form of the torque equation in terms of q-axis and d-axis stator currents is as follows:

$$Te = [nP/4]*[Lm^2/Lr]*iqs*ids \quad (9)$$

In equation [9], $iqs$ is recognized as the torque component of stator current and $ids$ is recognized as the flux component of stator current.

This equation shows that, when the d-q axes are oriented in the above manner, fast torque response can be achieved in an induction motor by applying stator currents, such that the flux component of stator current, $ids$, is held constant and the torque component of stator current, $iqs$, varies. Fast torque response is achieved, because the $iqs$ term flows only through the motor leakage inductances which are small. In contrast the flux component of stator current flows through the motor mutual inductance, which is large by comparison and can be changed only slowly. This strategy is the basic operating principle of field oriented control.

The major task in a field oriented control implementation, which is the subject of this invention, is the location of the angle of the rotor field flux vector which is rotating at the electrical excitation frequency. The orientation of the angle of the rotor field is necessary so that the three phase stator currents can be derived which have the proper phasing to maintain flux current constant while changing motor torque current. These stator currents are forced upon the motor by the inverter power switches in the implementation of field oriented control.

The subject of this invention is the application of the principles of modern state estimation theory to the task of locating the position of induction motor rotor flux and the use of these rotor flux estimates for the purpose of achieving field oriented control.

Another important relationship involving the torque current can be obtained from equation (3) with $W_{sl} = (W_e - W_r)$.

$$\omega sl = \frac{r_r \, iqr}{\lambda dr} \quad (10)$$

$$\omega sl = \frac{r_r \, Lm}{Lr} \cdot \frac{iqs}{\lambda dr}$$

$$\omega sl = \frac{r_r}{Lr} \cdot \frac{iqs}{ids}$$

This implies that for torque control in terms of $iqs$ and $ids$, a unique value of slip frequency exists for each change of $iqs$ or $ids$. The torque then is completely controlled by stator current and slip frequency. In addition, the torque current and field current are orthogonal.

Referring now to FIG. 2, a speed control system for a load L is shown to comprise an induction motor 10 having an output shaft 12a connected to drive the load in response to torque commands applied to the three-phase inputs 14, 16 and 18 of the motor. The torque commands representing instantaneous stator phase voltages required to achieve the current are obtained from the outputs 20, 22 and 24 of an inverter bank 26 connected to a regulated DC source 28. The inverter bank 26 converts AC current reference values $I_a$, $I_b$ and $I_c$ on lines 30, 32 and 34, respectively, into equally phase shifted alternating voltages which appear on outputs 20, 22 and 24 for application to the terminals of the motor 10. The current commands are generated by a microprocessor 36 in the form of a high speed digital computer with digital memory programmed to function as a discretized flux estimator as hereinafter explained. The microprocessor 36 is connected to receive input commands from an input device 38 which may comprise a data processing machine, a tape reader, a manual keyboard or combinations of these and other well-known digital data input sources.

The implementation of the flux estimator in the microprocessor 36, as hereinafter described in detail, is such as to require a rotor speed signal as an input which is sampled in real-time. This is obtained from a tachometer generator 40 which is connected to the motor output shaft 12b and connected by way of line 42 to an input of the microprocessor 36. In addition, the estimator equations utilize the three-phase stator voltage values generated by inverter 26 in response to the current values on inputs 30, 32 and 34. These voltage values are connected by way of feedback lines 44, 46 and 48 through an analog-to-digital converter 50 and cable 52 to another multiple line input port of the microprocessor 36.

Figure 3:
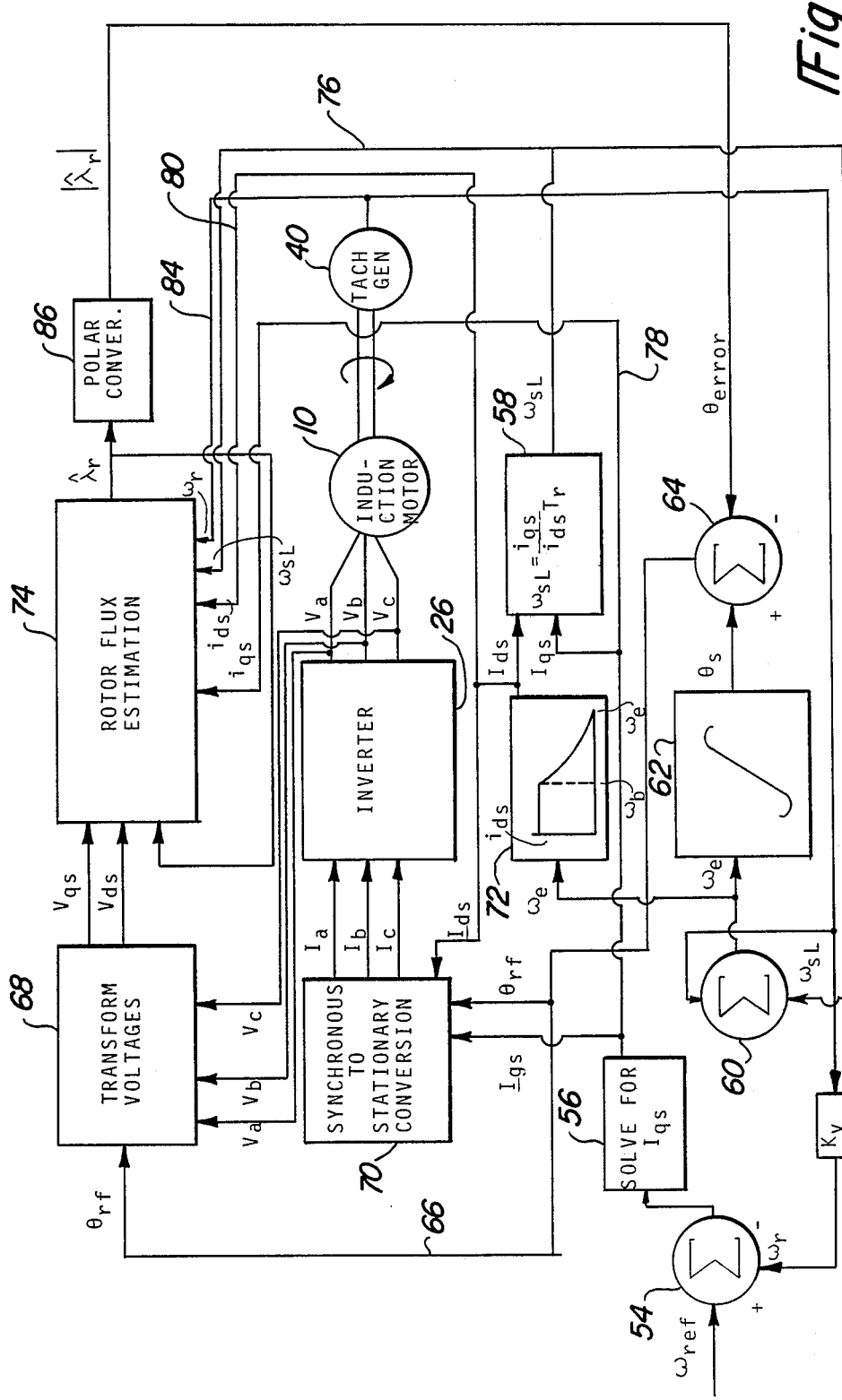
FIG. 3 is a mathmetical block diagram of the estimator used in the microprocessor of FIG. 2.

Looking now to FIG. 3, an overall mathematical arrangement of the computer software system including the flux estimator is shown in combination with the principal hardware components of the controlled system. These components comprise the induction motor 10, the inverter 26 and the tachometer generator 40. The balance of the components illustrated in FIG. 3 are computational phases which reside in the software of the microprocessor 36 as hereinafter described.

Referring to FIG. 3, a summer 54 receives the speed input command $W_{ref}$ from any suitable input signal source as a positive input summer 54 also receives a rotor frequency signal $W_r$ and a speed reference input and produces an output which is applied to computational unit 56 to solve for one of the quadrature components of stator current iqs. The equation for block 56 is $$iqs = \frac{Te * 4 * Lr}{nP * Lm^2 * ids}$$

This quantity is applied to an input of a computational unit 58 which calculates slip frequency $W_{sl}$ according to equations (10), the slip frequency signal being applied back to the speed control section of FIG. 3 as input to summer 60. The other input to summer 60 is the rotor frequency and the output is the stator frequency which is applied to an integrator 62 and also to a stator ids quadrature current chart 72 maintained in microprocessor memory. The output of the integrator 62 is uncorrected rotor flux position which is applied as a positive input to a summer 64, the negative input being the rotor flux error as hereinafter described. The output of the summer 64 is the estimate of rotor flux position and is applied by way of feedback line 66 to the voltage transformation unit 68 which also receives the stator line to neutral voltage components $V_a$, $V_b$ and $V_c$. The outputs of computational unit 68 are Vqs and Vds representing respectively the quadrature and direct components of stator voltage.

The quadrature component of the stator current ids produced by the stored chart 72 is applied as a second input to the computational unit 58 to produce the slip frequency which is applied as a second input to the summer 60, the first input to summer 60 being the rotor speed signal from tachometer generator 40.

It will be noted that the rotor flux estimator 74 receives six principal input signal quantities, iqs and ids representing respectively the quadrature and direct components of stator current, Vqs and Vds representing respectively the quadrature and direction components of stator voltage, and $W_{sl}$ and $W_r$ representing slip frequency and rotor frequency respectively. The quantity iqs is obtained on line 78 from computational unit 56; ids is obtained on line 80 from computational unit 72; $W_{sl}$ is obtained on line 76 from computational unit 58; and $W_r$ is obtained on line 84 from the tachometer generator 40. In addition, the rotor flux estimator receives as a correction signal, its own output; i.e., the rotor flux. The q-axis and d-axis rotor flux signals are converted to the polar coordinate system in computational unit 86 and the angle of the rotor flux is applied to the summer 64. A feature of the angle of rotor flux from computational unit 86 is that under field orientation, all the flux lies in the d-axis, and this angle is then equal to zero. If the estimator is in error, some q-axis flux will exist and the rotor flux angle is not zero. From this argument, the consideration of this angle as an error signal can be appreciated.

The synchronous to stationary conversion unit 70 receives the stator current quadrature components in the syncronously rotating q-axis and d-axis in the form of iqs from unit 56 and ids from unit 72 respectively, and the corrected rotor flux angle signal from summer 64 and produces three instantaneous current values, $I_a$, $I_b$ and $I_c$ in a stationary coordinate system which are applied to the inverter unit 26. The inverter unit 26 may constitute, for example, a standard three phase power converter capable of producing the alternating line to neutral voltage components $V_a$, $V_b$ and $V_c$ which are impressed upon the three phase input terminals of the induction motor 10 to realize current values $I_a$, $I_b$, $I_c$.

Figure 4:
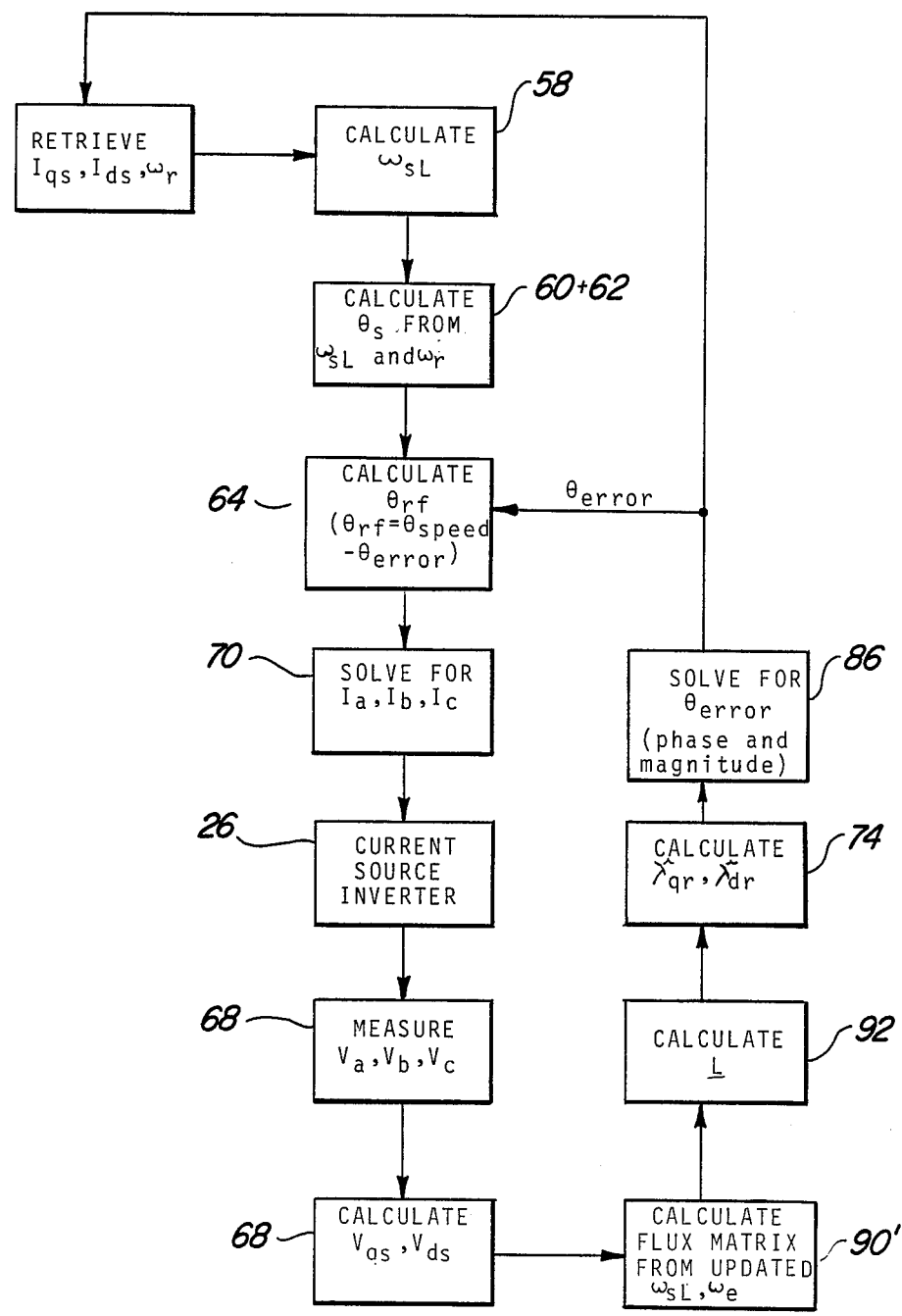
FIG. 4 is a flowchart of the estimator.

Referring now to FIG. 4, a detailed explanation of the aforementioned "computational units" as implemented in the microprocessor of FIG. 1 will be described in greater detail with reference to specific mathematical equations which exist in the estimator 74 in the form of programming. In addition, some effort will be made to indicate the derivation of the actual estimator equations thereby to assist the reader in generalizing the disclosure for other applications.

The reader will appreciate that the torque in any electromagnetic device is a function of flux intensity and current magnitude in a conductor cutting through the flux field. In an induction motor, torque is the product of quadrature components representing rotor flux and stator current. In continuous time, the differential equations representing an induction motor, in the q-axis and d-axis, are as follows:

$$\begin{bmatrix} iqs(t) \\ ids(t) \\ \lambda qr(t) \\ \lambda dr(t) \end{bmatrix} =$$

$$\begin{bmatrix} b/Ls' & -\omega_e(t) & Lm/(Ls'*Lr*Tr) & -Lm*\omega_r(t)/(Ls'*Lr) \\ \omega_e(t) & b/Ls' & Lm*\omega_r(t)/(Ls'*Lr) & Lm/(Ls'*Lr*Tr) \\ Lm/Tr & 0 & -1/Tr & -\omega_{sl}(t) \\ 0 & Lm/Tr & \omega_{sl}(t) & -1/Tr \end{bmatrix} *$$

$$\begin{bmatrix} iqs(t) \\ ids(t) \\ \lambda qr(t) \\ \lambda dr(t) \end{bmatrix} + \begin{bmatrix} 1/Ls' & 0 \\ 0 & 1/Ls' \\ 0 & 0 \\ 0 & 0 \end{bmatrix} * \begin{bmatrix} Vqs(t) \\ Vqr(t) \end{bmatrix}$$

However, the estimator of the present invention requires the use of the induction motor equations in discrete time.

A discretization of the continuous time matrix equations was performed by means of a first-order Euler approximation which is well known in system theory. This method converts a continuous time system described by $$X(t) = Ax(t) + Bu(t)$$

into a equivalent discrete time system described by $$X(k+1) = \phi x(k) + \Gamma u(k)$$

with the following relationships.

$$\phi = I + AT \quad \Gamma = \left(IT + \frac{AT^2}{2}\right) B$$

where T is the sample time. This method assumes that A and B are constant matrices, which is not true for the A-matrix in the induction motor equations. An important assumption is that the sample time T is short with respect to the time variation of A.

The resulting discrete time state matrices for the induction motor are as follows:

$$\begin{bmatrix} iqs(k+1) \\ ids(k+1) \\ \lambda qr(k+1) \\ \lambda dr(k+1) \end{bmatrix} =$$

$$\begin{bmatrix} 1+T*b/Ls' & -T*\omega_e & T*Lm/(Ls'*Lr*Tr) & -T*Lm*\omega_r/(Ls'*Lr) \\ T*\omega_e & 1+T*b/Ls' & T*Lm*\omega_r/(Ls'*Lr) & T*Lm/(Ls'*Lr*Tr) \\ T*Lm/Tr & 0 & 1-T/Tr & -T*\omega_{sl} \\ 0 & T*Lm/Tr & T*\omega_{sl} & 1-T/Tr \end{bmatrix} *$$

$$\begin{bmatrix} iqs(k) \\ ids(k) \\ \lambda qr(k) \\ \lambda dr(k) \end{bmatrix} + \begin{bmatrix} (T-(b*T^2/Ls'*2))/Ls' & -\omega_e*T^2/Ls'*2 \\ \omega_e*T^2/Ls'*2 & (T-(b*T^2/Ls'*2))/Ls' \\ Lm*T^2/(Ls'*Tr*2) & 0 \\ 0 & Lm*T^2/(Ls'*Tr*2) \end{bmatrix} * \begin{bmatrix} Vqs(k) \\ Vqr(k) \end{bmatrix}$$

From the discrete or real-time equations, the following reduced order estimator equation is derived and utilized in the microprocessor.

$$\begin{bmatrix} \lambda qr(k+1) \\ \lambda dr(k+1) \end{bmatrix} = \begin{bmatrix} 1-T/Tr & -T*\omega_{sl} \\ T*\omega_{sl} & 1-T/Tr \end{bmatrix} * \begin{bmatrix} \lambda qr(k) \\ \lambda dr(k) \end{bmatrix} +$$

$$\begin{bmatrix} T*Lm/Tr & 0 \\ 0 & T*Lm/Tr \end{bmatrix} * \begin{bmatrix} iqs(k) \\ ids(k) \end{bmatrix} +$$

$$\begin{bmatrix} Lm*T^2/(Ls'*Tr*2) & 0 \\ 0 & Lm*T^2/(Ls'*Tr*2) \end{bmatrix} *$$

$$\begin{bmatrix} Vqs(k) \\ Vds(k) \end{bmatrix} + [L] *$$

$$\left\{ \begin{bmatrix} iqs(k+1) \\ ids(k+1) \end{bmatrix} - \begin{bmatrix} 1+T*b/Ls' & -T*\omega_e \\ T*\omega_e & 1+T*b/Ls' \end{bmatrix} * \begin{bmatrix} iqs(k) \\ ids(k) \end{bmatrix} - \right.$$

$$\begin{bmatrix} (T-(b*T^2/Ls'*2))/Ls' & -\omega_e*T^2/Ls'*2 \\ \omega_e*T^2/Ls'*2 & (T-(b*T^2/Ls'*2))/Ls' \end{bmatrix} *$$

$$\begin{bmatrix} Vqs(k) \\ Vds(k) \end{bmatrix} -$$

$$\left. \begin{bmatrix} T*Lm/(Ls'*Lr*Tr) - T*Lm*\omega_r/(Ls'*Lr) \\ T*Lm*\omega_r/(Ls'*Lr) \; T*Lm/(Ls'*Lr*Tr) \end{bmatrix} * \begin{bmatrix} \lambda qr(k) \\ \lambda dr(k) \end{bmatrix} \right\}$$

It is important to note that the estimator gain L is updated according to the discrete time approach of the microprocessor. The gain matrix is as follows:

$$L = \begin{bmatrix} l_1 & l_2 \\ l_3 & l_4 \end{bmatrix} \tag{9}$$

The equation used to solve for the gains:

$$l_1 = \left[ \frac{Lm * T}{Lr * Tr * Ls'} - \frac{Lm * T^2}{Lr * Tr^2 * Ls'} + \right.$$

$$\left. \frac{Lm * \omega_r * \omega_{sl} * T^2}{Lr * Ls'} - \frac{Lm * T * \lambda_1}{Lr * Tr * Ls'} \right] /$$

$$\left[ \frac{Lm^2 * T^2}{Lr^2 * Tr^2 * Ls'^2} + \frac{Lm^2 * \omega_r^2 * T^2}{Lr^2 * Ls'^2} \right]$$

$$l_2 = \left[ -\omega_{sl} * T + \frac{l_1 * T * Lm * \omega_r}{Lr * Ls'} \right] / \frac{Lm * T}{Lr * Tr * Ls'}$$

$$l_3 = \left[ \omega_{sl} * T - \frac{l_4 * T * Lm * \omega_r}{Lr * Ls'} \right] / \frac{Lm * T}{Lr * Tr * Ls'}$$

$$l_4 = \left[ \frac{Lm * T}{Lr * Tr * Ls'} - \frac{Lm * T^2}{Lr * Tr^2 * Ls'} + \right.$$

$$\left. \frac{Lm * \omega_r * \omega_{sl} * T^2}{Lr * Ls'} - \frac{Lm * T * \lambda_2}{Lr * Tr * Ls'} \right] /$$

$$\left[ \frac{Lm^2 * T^2}{Lr^2 * Tr^2 * Ls'^2} + \frac{Lm^2 * \omega_r^2 * T^2}{Lr^2 * Ls'^2} \right]$$

The $\lambda$ values, $\lambda_1$ and $\lambda_2$ are the eigen-values whose values are chosen to guarantee convergence of the rotor flux error toward zero. Typical values are 0.95 to 0.87, the lower values resulting in faster convergence.

Referring again to FIG. 4, the step of calculating the voltages Vqs and Vds involve the measurement of actual stator voltages in the stationary 120° coordinate system and converting to a 90° rotating coordinate system using the following equations.

$$Vqs = Va \cos \theta_{rf} + Vb \cos (\theta_{rf} + 120°) + Vc \cos (\theta_{rf} + 240°)$$

$$Vds = Va \sin \theta_{rf} + Vb \sin (\theta_{rf} + 120°) + Vc \sin (\theta_{rf} + 240°)$$

It will be apparent that the calculation units 64, 68, 70, 58, 60, 62 of FIG. 2 are correspondingly numbered in the flowchart of FIG. 3.

The step of calculating the three phase current references in block 70 involves solving the following equations:

$$Ia = iqs \cos \theta_{rf} + ids \sin \theta_{rf}$$

$$Ib = (-\tfrac{1}{2} iqs - 0.866\ ids) \cos \theta_{rf} + (0.866\ iqs - \tfrac{1}{2} ids) \sin \theta_{rf}$$

$$Ic = -(Ia + Ib)$$

The flowchart box 90 represents the updating of the system matrices by the microprocessor in real-time. Box 92 represents updating of the gain values as previously described and box 74 represents the calculation of rotor flux. Block 86 represents the calculation of the rotor flux angle in the rotating 90° coordinate system to develop the error signal.

We claim:

1. The method of control of an induction motor to a commanded rotor speed by control of the stator voltages applied to the stator of the induction motor comprising the steps of:

measuring the rotor speed of the induction motor;

measuring the stator voltages applied to the stator of the induction motor;

computing the currents to be supplied to the stator of the induction motor to achieve the commanded speed by repetitively calculating the stator quadrature voltage and the stator direct voltage in a coordinate system rotating synchronously with the frequency of stator excitation in which the rotor flux in the direct axis is zero employing the measured stator voltages and a prior calculated rotor flux angle, calculating the rotor quadrature flux and rotor direct flux in said rotating coordinate system employing said measured rotor speed, the commanded rotor speed, said calculated stator quadrature voltage and said calculated stator direct voltage, calculating an estimated rotor flux angle employing said measured rotor speed and the commanded rotor speed, calculating a rotor flux angle error employing said calculated rotor quadrature flux and said calculated rotor direct flux, calculating a corrected rotor flux angle employing said calculated rotor flux angle and said calculated rotor flux error angle, and calculating the currents to be supplied to the stator of the induction motor to achieve the commanded speed employing said corrected rotor flux angle, said measured rotor speed and said commanded rotor speed; and supplying voltages to said stator to achieve said calculated stator currents.

2. The method of control of an induction motor as claimed in claim 6, wherein:

said step of computing the currents to be supplied to the stator of the induction motor to achieve the commanded speed includes calculating a quadrature axis stator current employing said measured rotor speed, the commanded rotor speed and a prior calculated direct axis stator current, calculating a direct axis stator current employing a prior calculated stator frequency, calculating a slip frequency employing said calculated quadrature axis stator current and said calculated direct axis stator current, calculating a stator frequency employing said measured rotor speed and a prior calculated slip frequency, calculating a rotor flux angle error employing said calculated rotor quadrature flux and said calculated rotor direct flux, and said step of calculating said rotor quadrature flux and said rotor direct flux in said rotating coordinate system employs said calculated stator quadrature voltage, said calculated stator direct voltage, said calculated stator quadrature axis current, said calculated stator direct axis current, said calculated slip frequency, said measured rotor speed, the prior calculated rotor quadrature flux and the prior calculated rotor direct flux, said step of calculating said estimated rotor flux angle is achieved by integration of said stator frequency, said step of calculating said corrected rotor flux angle includes subtraction of said calculated rotor flux angle error employing said uncorrected rotor flux angle, said step of calculating said currents to be supplied to the stator employs said calculated quadrature axis stator current, said calculated direct axis stator current and said corrected rotor flux angle.

3. The method of control of an induction motor as claimed in claim 2, wherein:

said step of calculating said direct axis stator current employs a stored chart relating stator frequency to direct axis stator current.

4. The method of control of an induction motor as claimed in claim 2, wherein:

said step of calculating said slip frequency employs the equation $$\omega_{sl} = \frac{iqs}{ids * Tr}$$

where $W_{sl}$ is the slip frequency to be calculated, iqs is the prior calculated quadrature axis stator current, ids is the prior calculated direct axis stator current and Tr is the rotor time constant which is the ratio of the rotor inductance to the rotor resistance.

5. The method of control of an induction motor as claimed in claim 2, wherein:

said step of calculating said stator frequency employs the sum of the measured rotor speed and the prior calculated slip frequency.

6. The method of control of an induction motor as claimed in claim 2, wherein:

said step of calculating said rotor quadrature flux and said rotor direct flux employs the equation $$\begin{bmatrix} \lambda qr(k+1) \\ \lambda dr(k+1) \end{bmatrix} = \begin{bmatrix} 1 - T/Tr & -T*\omega_{sl} \\ T*\omega_{sl} & 1 - T/Tr \end{bmatrix} * \begin{bmatrix} \lambda qr(k) \\ \lambda dr(k) \end{bmatrix} +$$

$$\begin{bmatrix} T*Lm/Tr & 0 \\ 0 & T*Lm/Tr \end{bmatrix} * \begin{bmatrix} iqs(k) \\ ids(k) \end{bmatrix} +$$

$$\begin{bmatrix} Lm*T^2/(Ls'*Tr*2) & 0 \\ 0 & Lm*T^2/(Ls'*Tr*2) \end{bmatrix} *$$

$$\begin{bmatrix} Vqs(k) \\ Vds(k) \end{bmatrix} + [L] *$$

$$\begin{bmatrix} iqs(k+1) \\ ids(k+1) \end{bmatrix} - \begin{bmatrix} 1 + T*b/Ls' & -T*\omega_e \\ T*\omega_e & 1 + T*b/Ls' \end{bmatrix} * \begin{bmatrix} iqs(k) \\ ids(k) \end{bmatrix} -$$

$$\begin{bmatrix} (T - (b*T^2/Ls'*2))/Ls' & -\omega_e*T^2/Ls'*2 \\ \omega_e*T^2/Ls'*2 & (T - (b*T^2/Ls'*2))/Ls' \end{bmatrix} *$$

$$\begin{bmatrix} Vqs(k) \\ Vds(k) \end{bmatrix} -$$

$$\begin{bmatrix} T*Lm/(Ls'*Lr*Tr) & -T*Lm*\omega_r/(Ls'*Lr) \\ T*Lm*\omega_r/(Ls'*Lr) & T*Lm/(Ls'*Lr*Tr) \end{bmatrix} * \begin{bmatrix} \lambda qr(k) \\ \lambda dr(k) \end{bmatrix}$$

where $+qr(k+1)$ is said rotor quadrature flux to be calculated, $\lambda dr(k+1)$ is said rotor direct flux to be calculated, k is an index variable for counting said computing repetitions, T is the time interval between said repetitions, Tr is the is the rotor time constant which is the ratio of the rotor inductance to the rotor resistance, $\omega_{sl}$ is said calculated slip frequency, $\lambda qr(k)$ is said prior calculated rotor quadrature flux, $\lambda dr(k)$ is said prior calculated rotor direct flux, Lm is the mutual inductance between rotor and stator, iqs(k) is said prior calculated quadrature axis stator current, ids(k) is said prior calculated direct axis stator current, Ls' is the stator transient inductance given by $$Ls' = \frac{Lr*Ls - Lm^2}{Lr}$$

Lr is the rotor inductance, Ls is the stator inductance, Vqs(k) is said prior calculated stator quadrature voltage, Vds(k) is said prior calculated stator direct voltage, the matrix L is given by $$[L] = \begin{bmatrix} l_1 & l_2 \\ l_3 & l_4 \end{bmatrix}$$

$$l_1 = \left[ \frac{Lm*T}{Lr*Tr*Ls'} - \frac{Lm*T^2}{Lr*Tr^2*Ls'} + \right.$$

$$\left. \frac{Lm*\omega_r*\omega_{sl}*T^2}{Lr*Ls'} - \frac{Lm*T*\lambda_1}{Lr*Tr*Ls'} \right] /$$

$$\left[ \frac{Lm^2*T^2}{Lr^2*Tr^2*Ls'^2} + \frac{Lm^2*\omega_r^2*T^2}{Lr^2*Ls'^2} \right]$$

$$l_2 = \left[ -\omega_{sl}*T + \frac{l_1*T*Lm*\omega_r}{Lr*Ls'} \right] / \frac{Lm*T}{Lr*Tr*Ls'}$$

$$l_3 = \left[ \omega_{sl}*T - \frac{l_4*T*Lm*\omega_r}{Lr*Ls'} \right] / \frac{Lm*T}{Lr*Tr*Ls'}$$

$$l_4 = \left[ \frac{Lm*T}{Lr*Tr*Ls'} - \frac{Lm*T^2}{Lr*Tr^2*Ls'} + \right.$$

$$\left. \frac{Lm*\omega_r*\omega_{sl}*T^2}{Lr*Ls'} - \frac{Lm*T*\lambda_2}{Lr*Tr*Ls'} \right] /$$

-continued $$\left[ \frac{Lm^2 * T^2}{Lr^2 * Tr^2 * Ls'^2} + \frac{Lm^2 * \omega_r^2 * T^2}{Lr^2 * Ls'^2} \right]$$

$\omega_r$ is the rotor frequency, $\lambda_1$ and $\lambda_2$ are eigenvalue constants selected from the range of 0.87 to 0.95, b is a constant given by $-(r_s + Lm/(Lr*Tr))$, and $\omega_e$ is the stator frequency.

7. The method of control of an induction motor as claimed in claim 2, wherein:

said step of calculating said currents to be supplied to the stator employs the equations $$I_a = iqs*\cos\theta_{rf} + ids*\sin\theta_{rf}$$

$$I_b = (-\tfrac{1}{2}iqs + 0.866\ ids)*\cos\theta_{rf} + (0.866\ iqs - \tfrac{1}{2}ids)*\sin\theta_{rf}$$

$$I_c = -(I_a + I_b)$$

where iqs is said calculated quadrature axis stator current, ids is said calculated direct axis stator current, and $\theta_{rf}$ is said calculated rotor position.

8. The method of control of an induction motor to a commanded rotor speed by control of the stator voltage applied to the stator of the induction motor comprising the steps of:

measuring the rotor speed of the induction motor;

measuring the stator voltages applied to the stator of the induction motor;

computing the currents to be supplied to the stator of the induction motor to achieve the commanded speed by repetitively calculating a first estimated rotor flux angle in a coordinate system rotating synchronously with the frequency of stator excitation in which the rotor flux in the direct axis is zero employing said measured rotor speed, calculating the rotor quadrature flux and rotor direct flux in said rotating coordinate system employing said measured rotor speed, and said measured stator voltages, calculating a rotor flux angle error employing said calculated rotor quadrature flux and said calculated rotor direct flux, calculating a second estimated rotor flux angle employing said calculated rotor flux angle and said calculated rotor flux error angle, and calculating the currents to be supplied to the stator of the induction motor to achieve the commanded speed employing said second estimated rotor flux angle, said measured rotor speed and said commanded rotor speed; and supplying voltages to said stator to achieve said calculated stator currents.

9. The method of control of an induction motor to a commanded rotor speed as claimed in claim 8, wherein:

said step of computing the currents to be supplied to the stator of the induction motor are repetitively performed via a digital processor.

* * * * *